(12) United States Patent
Ohta

(10) Patent No.: US 9,695,326 B2
(45) Date of Patent: Jul. 4, 2017

(54) INK JETTING INK SET AND CLEANING METHOD

(71) Applicant: Seiko Epson Corporation, Tokyo (JP)

(72) Inventor: Hitoshi Ohta, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1170 days.

(21) Appl. No.: 13/773,895

(22) Filed: Feb. 22, 2013

(65) Prior Publication Data

US 2013/0213440 A1  Aug. 22, 2013

(30) Foreign Application Priority Data

Feb. 22, 2012 (JP) .................. 2012-036299
Apr. 25, 2012 (JP) .................. 2012-100002

(51) Int. Cl.
| | |
|---|---|
| *C09D 11/40* | (2014.01) |
| *C09D 11/54* | (2014.01) |
| *C09D 11/30* | (2014.01) |
| *B08B 9/027* | (2006.01) |
| *B41J 2/17* | (2006.01) |
| *C09D 11/322* | (2014.01) |

(52) U.S. Cl.
CPC .............. *C09D 11/30* (2013.01); *B08B 9/027* (2013.01); *B41J 2/1707* (2013.01); *C09D 11/322* (2013.01); *C09D 11/40* (2013.01)

(58) Field of Classification Search
CPC .................................. C09D 11/54; C09D 11/40
See application file for complete search history.

(56) References Cited

U.S. PATENT DOCUMENTS

| | | | |
|---|---|---|---|
| 5,825,380 A | 10/1998 | Ichizawa et al. | |
| 2011/0050788 A1 | 3/2011 | Imamura et al. | |
| 2012/0223992 A1* | 9/2012 | Hirata ................ | B41J 2/2114 |
| | | | 347/14 |

FOREIGN PATENT DOCUMENTS

| | | |
|---|---|---|
| JP | 06-008437 B | 7/1987 |
| JP | 08-030200 B | 7/1987 |
| JP | 04-261476 A | 9/1992 |
| JP | 8-30200 B | 3/1996 |
| JP | 09-039260 A | 2/1997 |
| JP | 11-263021 A | 9/1999 |
| JP | 11-263022 A | 9/1999 |

(Continued)

OTHER PUBLICATIONS

English translation of JP 2007-119658.*

*Primary Examiner* — Veronica F Faison
(74) *Attorney, Agent, or Firm* — Nutter McClennen & Fish LLP; John J. Penny, Jr.; Alex Nagorniy

(57) ABSTRACT

An ink jetting ink set includes an ink composition for recording supplied to and used in an ink flow path and containing at least one of a glitter pigment and a metal oxide as a coloring material, and an auxiliary ink composition used in cleaning of the ink flow path, in which, in cases where a dynamic viscosity at 20° C. in the ink composition for recording is $\eta_1$ (mm²/s) and a surface tension at 20° C. is $\gamma_1$ (mN/m), and the dynamic viscosity at 20° C. in the auxiliary ink composition is $\eta_2$ (mm²/s) and the surface tension at 20° C. is $\gamma_2$ (mN/m), the following formula (1) and the following formula (2) are satisfied at the same time.

$$\eta_1 \leq \eta_2 \quad (1)$$

$$\gamma_1 \geq \gamma_2 \quad (2)$$

6 Claims, 1 Drawing Sheet

(56) References Cited

FOREIGN PATENT DOCUMENTS

| | | | |
|---|---|---|---|
| JP | 2000-109733 | A | 4/2000 |
| JP | 2000-328093 | A | 11/2000 |
| JP | 2002-105500 | A | 4/2002 |
| JP | 2007119658 | A * | 5/2007 |
| JP | 2011-046170 | A | 3/2011 |
| JP | 2011-224943 | A | 11/2011 |
| JP | 2012-025893 | A | 2/2012 |

* cited by examiner

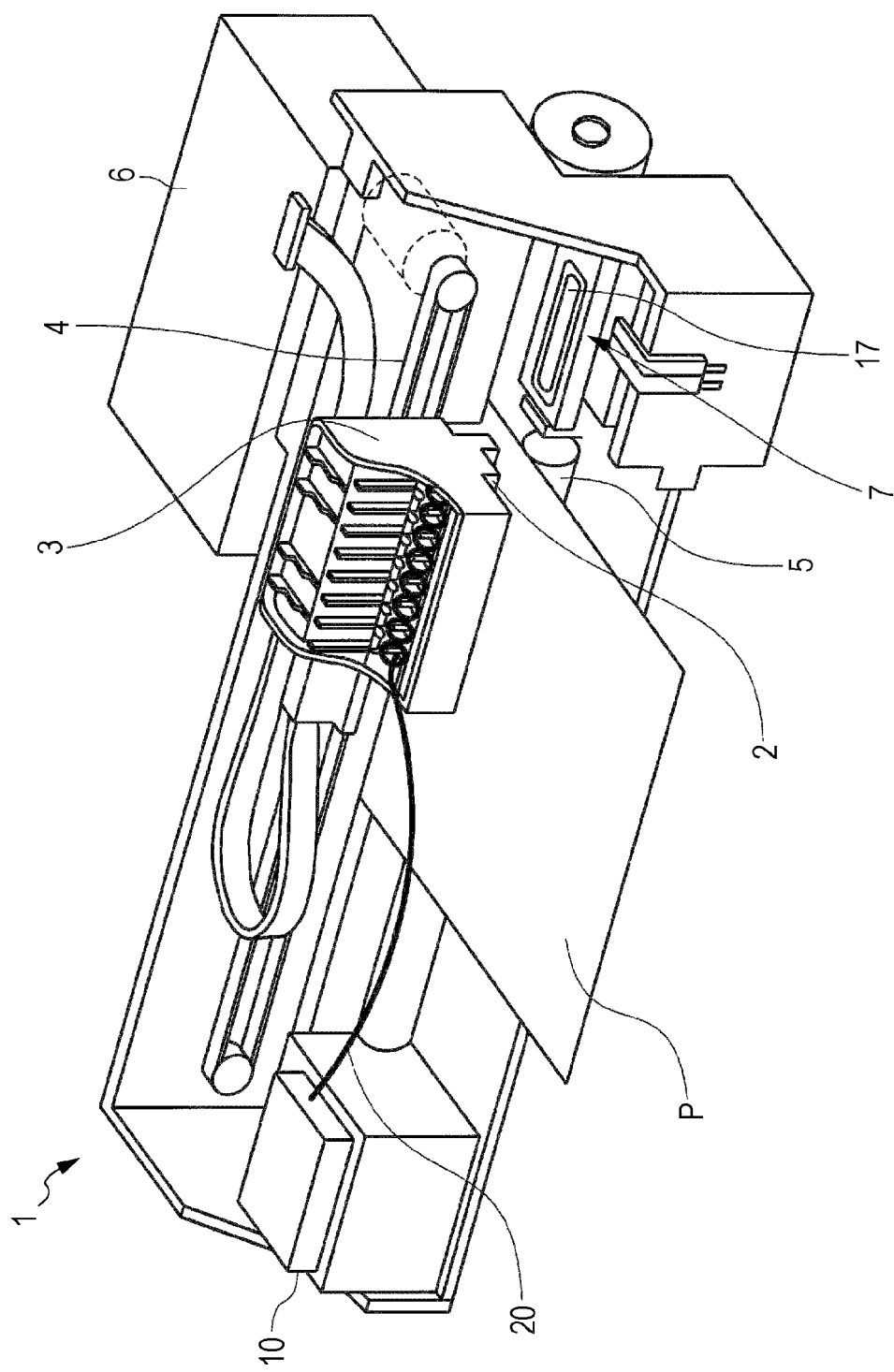

INK JETTING INK SET AND CLEANING METHOD

Priority is claimed under 35 U.S.C. §119 to Japanese Application No. 2012-036299 filed on Feb. 22, 2012 and No. 2012-100002 filed on Apr. 25, 2012, are hereby incorporated by reference in its entirety.

BACKGROUND

1. Technical Field

The present invention relates to an ink jetting ink set and a method of cleaning an ink flow path.

2. Related Art

In the related art, there have been known so-called ink jet recording apparatuses which record images and characters using minute ink droplets ejected from the nozzles of an ink jet recording head. An ink jet recording apparatus is provided with, for example, an ink flow path for circulating ink, such as a flow path for supplying ink to the ink jet recording head from the ink receiving unit storing the ink, or a flow path in the ink jet recording head for circulating the ink up to a nozzle opening portion (nozzle hole). For such ink flow paths, there is a problem in that clogging and the like of the ink for ink jet recording are easily generated in the ink flow path since the ink flow paths often have a minute structure.

With respect to this problem, for example, JP-B-06-8437, JP-B-08-30200, JP-A-04-261476, JP-A-11-263021, JP-A-11-263022, JP-A-2000-109733, JP-A-2000-328093, and JP-A-2002-105500 describe eliminating the clogging of nozzles, the clogging of the ink flow path, and the like by using a cleaning liquid or a maintenance liquid to moisturize the nozzle surfaces and circulate inside the ink flow path.

However, in a case where a recording ink containing a glitter pigment, a metal oxide, or the like as coloring material is used, since the coloring material included in the ink (glitter pigment, metal oxide, or the like) settles more easily in the ink flow path than ink coloring materials of the related art (for example, inorganic pigments, organic pigments, dyes, and the like), there have been cases when clogging or the like is generated in the ink flow path.

In such a case, even when the ink flow path is cleaned using the above-described cleaning liquid and maintenance liquid, there have been cases where it is not possible to sufficiently eliminate clogging of the ink flow path or clogging of the nozzles and ejection defects or the like in the ink composition for recording are generated.

SUMMARY

An advantage of some aspects of the invention is that it provides an ink set which has an excellent cleaning property for an ink flow path and which has excellent ejection stability.

The invention can be realized in the following forms or application examples.

Application Example 1

According to Application Example 1, there is provided an ink jetting ink set including an ink composition for recording supplied to and used in an ink flow path and containing at least one of a glitter pigment and a metal oxide as a coloring material, and an auxiliary ink composition used in cleaning of the ink flow path, in which, in cases where a dynamic viscosity at 20° C. in the ink composition for recording is $\eta_1$ (mm$^2$/s) and a surface tension at 20° C. is $\gamma_1$ (mN/m), and the dynamic viscosity at 20° C. in the auxiliary ink composition is $\eta_2$ (mm$^2$/s) and the surface tension at 20° C. is $\gamma_2$ (mN/m), the following formula (1) and the following formula (2) are satisfied at the same time.

$$\eta_1 \leq \eta_2 \quad (1)$$

$$\gamma_1 \geq \gamma_2 \quad (2)$$

According to the ink jetting ink set of Application Example 1, even in a case where the ink composition for recording containing a coloring material which settles easily is made to circulate in the ink flow path, since it is possible to favorably wash away the ink composition for recording using the auxiliary ink composition, the cleaning property of the ink flow path is excellent and the ejection stability of the ink composition for recording is excellent.

Application Example 2

In Application Example 1, $\eta_2$ may be 3 mm$^2$/s to 10 mm$^2$/s, and $\gamma_2$ may be 15 mN/m to 35 mN/m.

Application Example 3

In Application Example 1 or 2, the auxiliary ink composition may contain a surfactant having an anti-foaming property.

Application Example 4

In any one of Application Examples 1 to 3, the ink composition for recording may contain a kind of alkyl polyol with a normal boiling point of 180° C. to 250° C. without substantially containing a kind of alkyl polyol with a normal boiling point of 280° C. or more, and the auxiliary ink composition may contain a kind of alkyl polyol with a normal boiling point of 180° C. to 250° C.

Application Example 5

In any one of Application Examples 1 to 4, the auxiliary ink composition may contain a coloring material, and the content of the coloring material in the auxiliary ink composition may be 0.5 mass % or less.

Application Example 6

In any one of Application Examples 1 to 5, a freezing temperature of the auxiliary ink composition at a pressure of one atmosphere may be −15° C. or less.

Application Example 7

According to Application Example 7 of the invention, there is provided a cleaning method which cleans an ink flow path of an ink jet recording apparatus, in which the auxiliary ink composition described in any one of Application Examples 1 to 6 is circulated in the ink flow path.

Application Example 8

In the method according to Application Example 7, when the ink composition for recording is present in the ink flow path, the auxiliary ink composition may be circulated at a flow rate of 0.1 ml/(mm$^2$/s) or more in the ink flow path.

BRIEF DESCRIPTION OF THE DRAWING

The invention will be described with reference to the accompanying drawing, wherein like numbers reference like elements.

FIGURE is a perspective view showing a configuration of a printer according to an embodiment of the invention.

DESCRIPTION OF EXEMPLARY EMBODIMENTS

Below, description will be given of favorable embodiments of the invention. The embodiments described below are for describing examples of the invention. In addition, the invention is not limited by the below embodiments and includes various types of modifications carried out in a range not departing from the gist of the invention.

1. INK JETTING INK SET

The ink jetting ink set (below, simply referred to as "ink set") according to an embodiment of the invention includes an ink composition for recording supplied to and used in an ink flow path and containing at least one of a glitter pigment and a metal oxide as a coloring material, and an auxiliary ink composition used in cleaning of the ink flow path, in which, in cases where a dynamic viscosity at 20° C. in the ink composition for recording is $\eta_1$ (mm$^2$/s) and a surface tension at 20° C. is $\gamma_1$ (mN/m), and the dynamic viscosity at 20° C. in the auxiliary ink composition is $\eta_2$ (mm$^2$/s) and the surface tension at 20° C. is $\gamma_2$ (mN/m), the following formula (1) and the following formula (2) are satisfied at the same time.

$$\eta_1 \leq \eta_2 \tag{1}$$

$$\gamma_1 \geq \gamma_2 \tag{2}$$

By the relationship between the dynamic viscosity and the surface tension of the ink composition for recording and the auxiliary ink composition satisfying the following formula (1) and the following formula (2) at the same time, the function of washing away the ink composition for recording provided with the auxiliary ink composition is remarkably improved. The reason is as follows.

That is, when the dynamic viscosity of the auxiliary ink composition becomes equal to or greater than the dynamic viscosity of the ink composition for recording (formula (1)), the power of the auxiliary ink composition which washes away the ink composition for recording and sediment derived therefrom is increased. In addition, when the surface tension of the auxiliary ink composition becomes equal to or less than the surface tension of the ink composition for recording (formula (2)), the mixing of the auxiliary ink composition with the ink composition for recording occurs easily, and the sediment derived therefrom is easily permeated. By so doing, the ink composition for recording in the ink flow path and the sediment derived therefrom are easily washed away with efficiency by the auxiliary ink composition.

In this manner, by satisfying the above-described formula (1) and the above-described formula (2) at the same time, the function of the auxiliary ink composition washing away the ink composition for recording is remarkably increased. Therefore, when the ink set according to the present embodiment is used, even in a case where the ink composition for recording containing coloring material which settles easily is supplied to the ink flow path, it is possible for the auxiliary ink composition to sufficiently clean the ink flow path. In this manner, it is possible to reduce clogging of the ink flow path and clogging of the nozzles, and thereafter it is possible to improve the ejection stability of the ink composition for recording ejected from the nozzles.

In addition, the relationship between the dynamic viscosity and the surface tension of the ink composition for recording and the auxiliary ink composition more preferably satisfies the following formula (1-1) and the following formula (2-1) at the same time from the point of view of the ease of handling and fluidity of the auxiliary ink composition.

$$0 \leq \eta_2 - \eta_1 \leq 5 \tag{1-1}$$

$$-5 \leq \gamma_2 - \gamma_1 \leq 0 \tag{2-1}$$

A more preferable range for the above-described formula (1-1) is $0 \leq \eta_2 - \eta_1 \leq 3$.

Below, detailed description will be given of the ink composition for recording and the auxiliary ink composition configuring the ink set according to the present embodiment.

1.1. Ink Composition for Recording

The ink composition for recording configuring the ink set according to the present embodiment records an image on a recording medium by being supplied to and used in an ink flow path (described later) of an ink jet recording apparatus, circulated in the ink flow path, and ejected from nozzle holes.

Below, description will be given of each component included in the ink composition for recording.

1.1.1. Coloring Material

The ink composition for recording according to the present embodiment contains at least one of a glitter pigment and a metal oxide as the coloring material.

Examples of the metal oxide include titanium dioxide, zinc oxide, silica, alumina, magnesium oxide and the like. It is possible to use these metal oxides as white pigments, and in such a case, the use of titanium dioxide is particularly preferable from the point of view of excellent whiteness and abrasion resistance.

In a case where metal oxide is used as the white pigment, the volume-based average particle diameter thereof (below, referred to as the "average particle diameter") is preferably 200 nm or more, and more preferably 200 nm to 400 nm. By the average particle diameter of the white pigment being within this range and in particular not exceeding the lower limit thereof, it is possible to record an image provided with excellent whiteness. In addition, by the average particle diameter of the white pigment being within this range and in particular not exceeding the upper limit, it is possible to obtain a white ink with excellent ejection stability.

It is possible to measure the average particle diameter of the white pigment using a particle size distribution measuring apparatus with the laser diffraction scattering method as the measurement principle. Examples of the particle size distribution measuring apparatus include a particle size distribution meter with the dynamic light scattering method as the measurement principle, for example, Microtrac UPA (trade name, manufactured by Nikkiso Co., Ltd.).

In addition, the glitter pigment is not particularly limited as long as it exhibits glitter when attached to a medium, and examples thereof include alloys (also referred to as metal pigments) of one type or two or more types selected from a group formed of aluminum, silver, gold, platinum, nickel, chromium, tin, zinc, indium, titanium, and copper, or pearlescent pigments having a pearly gloss. Representative examples of pearlescent pigments include mica coated with titanium dioxide, argentine, and pigments having a pearlescent gloss or an interference gloss, such as bismuth acid chloride and the like. In addition, the glitter pigment may undergo a surface treatment for suppressing a reaction with water. By including the glitter pigment in the ink, it is possible to form an image having excellent glitter.

For the above-described coloring materials, one may be used alone or a mixture of two or more may be used.

It is possible to appropriately select the content of the coloring materials according to the usage; however, the content is preferably 1% by mass to 30% by mass with respect to the total mass of the ink composition for recording, and more preferably 1% by mass to 20% by mass.

1.1.2. Alkyl Polyols

The ink composition for recording according to the present embodiment may contain alkyl polyols of which the normal boiling point is 180° C. to 250° C. As a result of the ink composition for recording according to the present embodiment containing alkyl polyols of which the boiling point is within the above-described range, there are cases where the control of the wetting and spreading property and the drying property of the ink composition for recording becomes even easier. In this manner, since it is possible to reduce the clogging of the nozzle, the above is preferable.

The alkyl polyols have a normal boiling point which is 180° C. to 250° C., and 188° C. to 230° C. is preferable. By the normal boiling point of the alkyl polyols being within the above-described range and in particular not exceeding the lower limit thereof, the moisture retaining property of the ink composition for recording is favorable and the suppression of the generation of nozzle clogging is easier, which is preferable. By the normal boiling point of the alkyl polyols being within the above-described range and in particular not exceeding the upper limit thereof, it is possible to suppress the generation of uneven shading in the image and the deterioration of the fixing property of the image without greatly deteriorating the drying property of the ink composition for recording, which is preferable.

Examples of the alkyl polyols of which the normal boiling point is 180° C. to 250° C. include propylene glycol [189° C.], dipropylene glycol [230° C.], 1,2-butanediol [192° C.], 1,3-butylene glycol [208° C.], 1,2-pentanediol [210° C.], 1,2-hexanediol [224° C.], 1,2-heptanediol [227° C.], 3-methyl-1,3-butanediol [203° C.], 2-ethyl-2-methyl-1,3-propanediol [226° C.], 2-methyl-1,3-propanediol [214° C.], 2-methyl-2-propyl-1,3-propanediol [230° C.], 2,2-dimethyl-1,3-propanediol [210° C.], 2-methylpropane-2,4-diol [197° C.], and the like. Here, the numerical values in parentheses represent the normal boiling point.

Alkyl polyols of which the normal boiling point is 180° C. to 250° C. may be used alone as a single type, or two or more types may be mixed and used.

The content of the alkyl polyols is preferably included in the range of 8 mass % to 25 mass % with respect to the total mass of the ink composition for recording from the points of view of the effects of improving the wetting and spreading property on the recording medium and reducing the uneven shading and securing the storage stability and ejection reliability of the ink composition for recording.

In addition, the ink composition for recording according to the present embodiment substantially does not contain alkyl polyols of which the normal boiling point is 280° C. or more. When alkyl polyols of which the normal boiling point is 280° C. or more are included, there are cases where the drying property of the ink composition for recording is significantly deteriorated. This is because, as a result, not only is the uneven shading of the image noticeable, but the fixing property of the image is also deteriorated in some cases. Examples of the alkyl polyols of which the normal boiling point is 280° C. or more include glycerin (normal boiling point 290° C.).

Here, in the invention, "substantially does not contain A" signifies an extent at which A is not added exceeding an amount sufficient for the addition of A to be significant. Specific examples of "substantially not included" are that, for example, no more than 1.0 mass % is included, preferably no more than 0.5 mass % is included, more preferably no more than 0.1 mass % is included, even more preferably no more than 0.05 mass % is included, particularly preferably no more than 0.01 mass % is included, and yet more preferably no more than 0.001 mass % is included.

1.1.3. Other Components

The ink composition for recording according to the embodiment is able to further contain water, resin dispersing agents, resins, glycol ethers, waxes, pyrrolidones, surfactants, pH adjusting agents, fungicides or preservatives, rust inhibitors, chelating agents, or the like. If the ink composition for recording according to the present embodiment contains these compounds, its characteristics may be further improved in some cases.

Water

The ink composition for recording according to the present embodiment may contain water. The water is the main medium of the ink composition for recording and is a component to be evaporated and dispersed by drying. The water is preferably one for which ionic impurities have been removed as much as possible such as pure water or ultrapure water, such as ion-exchanged water, ultrafiltration water, reverse osmosis water, and distilled water. In addition, when water, which has been sterilized by ultraviolet irradiation, the addition of hydrogen peroxide, or the like, is used, it is possible to favorably prevent the occurrence of molds or bacteria in a case where a pigment dispersion and the ink composition for recording using the same are stored for a long time.

Resin Dispersing Agents

The ink composition for recording according to the present embodiment may contain a resin dispersing agent from the point of view of improving the dispersibility of the above-described coloring material in the ink composition for recording. As the resin dispersing agent, any water-soluble or water-insoluble type may be used.

Examples of the resin dispersing agent specifically include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof.

Examples of the salts include salts with basic compounds such as ammonia, ethylamine, diethylamine, triethylamine, propylamine, isopropylamine, dipropylamine, butylamine, isobutylamine, diethanolamine, triethanolamine, triisopropanolamine, amino methyl propanol, and morpholine.

Resin

A resin may be added to the ink composition for recording according to the present embodiment from the point of view of improving the fixing property with respect to the recording medium. Examples of the resin include fibrous-based resins such as acrylic resins, styrene-acrylic resins, rosin modified resins, phenol resins, terpene-based resins, polyester resins, polyamide resins, epoxy resins, polyurethane resins, vinyl chloride vinyl acetate copolymer resins, and cellulose acetate butyrates; vinyl toluene-α-methyl styrene copolymer resins, and the like. For these resins, one type thereof may be used independently, and two or more types may also be mixed and used.

Glycol Ethers

The ink composition for recording according to the present embodiment may contain glycol ethers. It is possible for glycol ethers to improve the wetting and spreading property of the ink composition for recording and to improve the fixing property of the ink composition for recording.

Specific examples of such glycol ethers include ethylene glycol mono-isobutyl ether, ethylene glycol mono-hexyl ether, ethylene glycol mono-iso-hexyl ether, diethylene glycol mono-hexyl ether, triethylene glycol mono-hexyl ether, diethylene glycol mono-iso-hexyl ether, triethylene glycol mono-iso-hexyl ether, ethylene glycol mono-iso-heptyl ether, diethylene glycol mono-iso-heptyl ether, triethylene glycol mono-iso-heptyl ether, ethylene glycol mono-octyl ether, ethylene glycol mono-iso-octyl ether, diethylene glycol mono-iso-octyl ether, triethylene glycol mono-iso-octyl ether, ethylene glycol mono-2-ethylhexyl ether, diethylene glycol mono-2-ethylhexyl ether, triethylene glycol mono-2-ethylhexyl ether, diethylene glycol mono-2-ethyl pentyl ether, ethylene glycol mono-2-ethyl pentyl ether, ethylene glycol mono-2-methyl-pentyl ether, diethylene glycol mono-2-methyl pentyl ether, propylene glycol monobutyl ether, dipropylene glycol monobutyl ether, tripropylene glycol monobutyl ether, propylene glycol mono-propyl ether, dipropylene glycol mono-propyl ether, tripropylene glycol monomethyl ether, and the like. These can be used independently as one type or as a mixture of two or more types.

Wax

The ink composition for recording according to the present embodiment may contain a wax. The wax imparts lubrication to the surface of the recorded image. In this manner, since it is possible to suppress the generation of peeling, rubbing, and the like of the image, the fixing property of the image is improved.

As the components configuring the wax, for example, it is possible to use plant and animal waxes such as carnauba wax, candle wax, beeswax, rice wax, and lanolin; petroleum based waxes such as paraffin wax, microcrystalline wax, polyethylene wax, oxidized polyethylene wax, and petrolatum; mineral waxes such as montan wax, and ozokerite; synthetic waxes such as carbon wax, Hoechst wax, polyolefin wax, and stearic acid amide; natural or synthetic wax emulsions or mixed waxes such as α-olefin maleic anhydride copolymer or the like, and these can be used alone or a plurality of types can be mixed and used.

It is possible to use a commercial product as it is as the wax, and examples thereof include Nopukoto PEM-17 (trade name, manufactured by San Nopco Limited.), CHEMIPEARL W4005 (trade name, manufactured by Mitsui Chemicals, Inc.), AQUACER 515, AQUACER 539, AQUACER 593 (the above are trade names manufactured by BYK-Chemie Japan Co., Ltd.), and the like.

Pyrrolidones

It is possible to use pyrrolidones from the point of view of improving the fixing property of the ink composition for recording. Examples of such pyrrolidones include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like.

Surfactant

The surfactant provides an effect of uniformly wetting and spreading the ink composition for recording on the recording medium. The surfactant is not particularly limited; however, it is preferably a non-ionic surfactant. Among non-ionic surfactants, one or both of silicone-based surfactants and acetylene glycol-based surfactants are more preferable. A case where silicone-based surfactants and acetylene glycol-based surfactants are combined is even more preferable.

A polysiloxane based compound is preferably used as the silicone-based surfactant and examples thereof include polyether-modified organosiloxane. In more detail, examples thereof include BYK-306, BYK-307, BYK-333, BYK-341, BYK-345, BYK-346, BYK-347, BYK-348, BYK-349, (the above are trade names manufactured by BYK-Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017, (the above are trade names manufactured by Shin-Etsu Chemical Co., Ltd.) and the like.

In comparison with other non-ionic surfactants, the acetylene glycol-based surfactants have an excellent ability to appropriately maintain the surface tension and interfacial tension, and have the characteristic that there is almost no foaming. In this manner, since the ink composition for recording containing the acetylene glycol-based surfactant is able to appropriately maintain the surface tension and the interfacial tension with the printer member coming into contact with the ink composition for recording of the head nozzle face or the like, it is possible to increase the ejection stability when the above is applied to the ink jet recording method. In addition, examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF-110D, 82 (the above are all trade names produced by Air Products and Chemicals Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3, (the above are all trade names produced by Nissin Chemical Industry Co., Ltd.), Acetylenol E00, E00P, E40, E100, (the above are all trade names produced by Kawaken Fine Chemicals Co., Ltd.), and the like.

Others

Examples of the pH adjusting agent include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate and the like.

Examples of fungicides or preservatives include sodium benzoate, pentachlorophenol sodium, 2-pyridine thiol-1-sodium oxide, sodium sorbate, sodium dehydroacetic acid, 1,2-dibenzisothiazoline-3-on, and the like. Examples of commercially available products include Proxel XL2, Proxel GXL, (the above are trade names produced by Avecia Co., Ltd.), or Denicide CSA, NS-500W (the above is a trade name produced by Nagase Chemtex Co., Ltd.).

Examples of the rust inhibitor include benzotriazole and the like.

Examples of the chelating agent include ethylenediaminetetraacetic acid and salts thereof (such as ethylenediaminetetraacetic acid disodium hydrogen salt), iminodisuccinic acid and salts thereof, and the like.

1.1.4. Preparation Method of Ink Composition for Recording

The ink composition for recording according to the present embodiment is obtained by mixing the above-mentioned components in an arbitrary order, performing filtration or the like according to necessity, and removing impurities. As the method of mixing each component, a method of sequentially adding material to a container provided with a stirring apparatus such as a mechanical stirrer or a magnetic stirrer and then stirring and mixing may be favorably used. As the method of filtration, it is possible to perform centrifugal filtration, filtration using a filter, or the like according to necessity.

1.1.5. Properties of Ink Composition for Recording

In the ink composition for recording according to the present embodiment, from the point of view of the balance between the image quality and the reliability as an ink composition for ink jet recording, the surface tension at 20° C. is preferably 20 mN/m to 50 mN/m, and more preferably 20 mN/m to 40 mN/m. Here, for example, the measurement of the surface tension can be measured by confirming the surface tension when a platinum plate is wetted with the ink composition for recording in an environment of 20° C. using an Automatic Surface Tensiometer CBVP-Z (trade name, manufactured by Kyowa Interface Science Co., Ltd.).

In addition, from a similar point of view, the dynamic viscosity at 20° C. of the ink composition for recording according to the present embodiment is preferably 2 mm$^2$/s to 8 mm$^2$/s, and more preferably 2 mm$^2$/s to 5 mm$^2$/s. Here, it is possible to perform the measurement of the dynamic viscosity by confirming the dynamic viscosity in an environment of 20° C. using a Canon-Fenske VMC type viscometer and an automatic viscosity measurement apparatus VMC-352 type (both are trade names, manufactured by Rigo Co., Ltd.).

The pH of the ink composition for recording is preferably neutral or alkaline, and more preferably within a range of 7.0 to 10.0 in an environment of 20° C. By the pH being in the above-described range, the storage stability and dispersion stability of the ink composition for recording become favorable. In addition, in a case where metal components are used in the ink flow path of the ink jet recording apparatus, it is possible to suppress the generation of corrosion or the like.

1.2 Auxiliary Ink Composition

It is possible to use the auxiliary ink composition according to the present embodiment in the cleaning of the ink flow path in an ink jet recording apparatus. Below, description will be given of the components included in the auxiliary ink composition according to the present embodiment. Here, the auxiliary ink composition has a favorable cleaning property for a part or the whole of the inside of the flow path; however, this may also be combined and used for another purpose as an auxiliary liquid of the recording apparatus. For example, it may be used in a moisturizing liquid which is filled in advance before filling another ink composition inside the head.

1.2.1. Surfactant

The auxiliary ink composition according to the present embodiment preferably contains a surfactant. The surfactant increases the wettability of the auxiliary ink composition with respect to the ink flow path, whereby it is possible to increase the cleaning property of the ink flow path. In addition, the surfactant decreases the surface tension of the auxiliary ink composition, whereby it is possible to increase the permeability of the ink composition for recording inside the ink flow path and the auxiliary ink composition with respect to the sediment. In this manner, it is possible to improve the cleaning property of the ink flow path.

Any surfactant may be used as the surfactant; however, a non-ionic surfactant is preferable. Among non-ionic surfactants, one or both of silicone-based surfactants and acetylene glycol-based surfactants are more preferable. A case where silicone-based surfactants and acetylene glycol-based surfactants are combined is even more preferable.

A polysiloxane based compound is preferably used as the silicone-based surfactant and examples thereof include polyether-modified organosiloxane. In more detail, examples thereof include BYK-306, BYK-307, BYK-333, BYK-341, BYK-345, BYK-346, BYK-347, BYK-348, BYK-349, (the above are trade names manufactured by BYK-Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017, (the above are trade names manufactured by Shin-Etsu Chemical Co., Ltd.) and the like.

In comparison with other non-ionic surfactants, the acetylene glycol-based surfactants have an excellent ability to appropriately maintain the surface tension and interfacial tension, and have the characteristic that there is almost no foaming. In this manner, since the auxiliary ink composition containing the acetylene glycol-based surfactant can appropriately maintain the surface tension and the interfacial tension with the printer member coming into contact with the ink composition of the head nozzle face or the like, it is possible to increase the ejection stability when the above is applied to the ink jet recording method. In addition, examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF-110D, 82 (the above are all trade names produced by Air Products and Chemicals Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3, (the above are all trade names produced by Nissin Chemical Industry Co., Ltd.), Acetylenol E00, E00P, E40, E100, (the above are all trade names produced by Kawaken Fine Chemicals Co., Ltd.), and the like.

Among the surfactants described above, as the surfactant used in the auxiliary ink composition, it is preferable to include at least one kind of surfactant (anti-foaming agent) having an anti-foaming property. Examples of ones having favorable anti-foaming properties suitably include silicone anti-foaming agents, polyether anti-foaming agents, fatty acid ester anti-foaming agents, acetylene-based anti-foaming agents, and the like. These may be used independently as one kind or in combination of two or more kinds. Among these, silicone-based anti-foaming agents and acetylene glycol-based anti-foaming agents are preferable from the point of view of having an excellent foam breaking effect.

Surfactants having the above-mentioned anti-foaming property preferably have an HLB value of 6 or less based on Griffin's method, and more preferably 5 or less. Since surfactants with an HLB value of 6 or less are able to suppress the generation of foam in the ink flow path during the cleaning, it is possible to reduce the ejection defects in the ink composition for recording and the auxiliary ink composition due to the foam being mixed therein. In particular, in a case where a piezo-type ink jet recording apparatus is used, since the ejection defects are easily generated by the generation of foam inside the ink flow path, it is preferable to add a surfactant with an HLB value of 5 or less to the auxiliary ink composition.

Here, the HLB value of the surfactant used in the present embodiment is a value to evaluate the hydrophilicity of the compounds proposed by Griffin, and refers to a value calculated by the following formula (3). The HLB value according to the Griffin method indicates a value in a range of 0 to 20, and a larger numerical value indicates that the compound is hydrophilic.

$$HLB \text{ value}=20\times(\text{mass \% of hydrophilic group})=20\times(\text{sum of the formula weight of hydrophilic group/molecular weight of the surfactant}) \quad (3)$$

Examples of surfactants having an HLB value of 6 or less specifically include Surfynol 104, 104E, 104H, 104A, 104BC, 104DPM, 104PA, 104PG-50, 104S, 420, DF-110D, 82, (the above are all trade names produced by Air Products and Chemicals Inc.), BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, BYK-1770, (the above are all trade names produced by BYK-Chemie Japan Co., Ltd.).

In a case where these surfactants are contained, the content is preferably 0.01 mass % to 1 mass % with respect to the total mass of the auxiliary ink composition.

1.2.2. Alkyl Polyols

The auxiliary ink composition according to the present embodiment may contain alkyl polyols of which the normal boiling point is 180° C. to 250° C. By adding the alkyl polyols in which the boiling point is in the above-described range, it is possible to preferably use the auxiliary ink composition from the point of view of easily adjusting the dynamic viscosity thereof. In addition, in a case where the ink flow path is filled with the auxiliary ink composition and the ink jet recording apparatus is stored for a long period, it is possible to further suppress the drying of the ink flow path. In this manner, since it is possible to reduce the clogging of the nozzle, the above is preferable.

The alkyl polyols have a normal boiling point which is 180° C. to 250° C., and 188° C. to 230° C. is preferable. By the normal boiling point of the alkyl polyols being within the above-described range, the moisture retaining property of the auxiliary ink composition is favorable and the suppression of the generation of nozzle clogging is easier, which is preferable.

Since specific examples of the alkyl polyols with a normal boiling point of 180° C. to 250° C. are the same as the materials exemplified in the above-mentioned ink composition for recording, description thereof will be omitted. Alkyl polyols of which the normal boiling point is 180° C. to 250° C. may be used alone as a single type, or two or more types may be mixed and used.

As alkyl polyols with a normal boiling point of 180° C. to 250° C. to be added to the auxiliary ink composition, it is possible to preferably use the same ones as the alkyl polyols included in the ink composition for recording. When the alkyl polyols included in the auxiliary ink composition and the alkyl polyols included in the ink composition for recording are in common, it is preferable from the point of view of being able to efficiently perform the substitution of the auxiliary ink composition and the ink composition for recording.

The content of the alkyl polyols is preferably 20 mass % to 50 mass % and more preferably 30 mass % to 50 mass % with respect to the total mass of the auxiliary ink composition from the point of view of setting the dynamic viscosity of the auxiliary ink composition to an appropriate range and securing the storage stability of the auxiliary ink composition.

In addition, also for the auxiliary ink composition, in a case where there is a need to balance the drying property with the ink composition for recording, it is preferable that an alkyl polyol with a normal boiling point of 280° C. or more be substantially not contained. Here, "substantially not contained" indicates not being contained in an amount sufficient for the addition to be significant. Specific examples of the above-described alkyl polyols being "substantially not included" are that, for example, no more than 1.0 mass % is included, preferably no more than 0.5 mass % is included, more preferably no more than 0.1 mass % is included, even more preferably no more than 0.05 mass % is included, particularly preferably no more than 0.01 mass % is included, and most preferably no more than 0.001 mass % is included.

1.2.3. Coloring Material

The auxiliary ink composition according to the present embodiment may contain a coloring material. By coloring the auxiliary ink composition, it is possible to use the auxiliary ink composition as a testing ink used for testing the normal ejection of the heads prior to shipping. In this manner, it is possible to omit complicated steps such as replacing the ink flow path at the time of shipping with the auxiliary ink composition again.

Examples of the coloring material include pigments, dyes, and the like.

Specifically, as the pigments, it is possible to use known inorganic pigments, organic pigments, and carbon black, for example, it is possible to use insoluble azo pigments, condensed azo pigments, azo lake, azo pigments such as chelate azo pigments, phthalocyanine pigments, perylene and perinone pigments, anthraquinone pigments, quinacridone pigments, dioxane pigments, thioindigo pigments, isoindolinone pigments, polycyclic pigments such as quinophthalone pigments, chelate dyes, lake dyes, nitro pigments, nitroso pigments, aniline black, daylight fluorescent pigments, and the like. The above-described pigments may be used alone as one kind or a mixture of two or more kinds may be used.

In addition, as the dyes, for example, it is possible to use various types of dyes used in normal ink jet recording such as direct dyes, acid dyes, food dyes, basic dyes, reactive dyes, disperse dyes, vat dyes, soluble vat dyes, reaction disperse dyes, or the like. The above-described dyes may be used alone as one kind or a mixture of two or more kinds may be used.

In a case where the coloring material is added, the content thereof is preferably 0.5% mass % or less with respect to the total mass of the auxiliary ink composition, and more preferably 0.01 mass % to 0.5 mass %. By the content of the coloring material being 0.5 mass % or less, it is possible to secure a recording density which suffices for using the auxiliary ink composition as an ejection confirming testing liquid for the ink jet printer head as it is, and, additionally, defects are not easily generated due to mixing with the ink even at the time of replacing the ink composition for recording in the subsequent steps, which is preferable.

In a case where the pigment is used as the coloring material, the pigment is preferably set so as to be able to be stably dispersed and held in water. Examples of the method include a method of dispersing in a resin dispersing agent of one or both of water-soluble resin and water-dispersible resin (below, pigments treated according to this method are described as "resin dispersed pigments"); a method of dispersing in a surfactant of one or both of a water-soluble surfactant and a water-dispersible surfactant (below, pigments treated according to this method are described as "surfactant dispersed pigments"); a method chemically and physically introducing a hydrophilic functional group into the pigment particle surface and capable of performing dispersing or dissolving in water without a dispersing agent such as the resin or the surfactant (below, pigments treated according to this method are described as "surface treated pigments"); and the like. The auxiliary ink composition according to the present embodiment is able to use any of the resin dispersed pigment, the surfactant dispersed pigment, and the surface treated pigment, and these can be used in the form of a plurality of types mixed together according to necessity; however, it is preferable that the resin dispersed pigment be contained.

Examples of the resin dispersing agent used in the resin dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among these, a copolymer of a monomer having a hydrophobic functional group and a monomer having a hydrophilic functional group, and a polymer formed of monomers having both a hydrophobic functional group and a hydrophilic functional group is preferable. As the form of the copolymer, it is possible to use any form of a random copolymer, a block copolymer, an alternating copolymer, and a graft copolymer.

The salts include salts with basic compounds such as ammonia, ethylamine, diethylamine, triethylamine, propylamine, isopropylamine, dipropylamine, butylamine, isobutylamine, diethanolamine, triethanolamine, triisopropanolamine, amino methyl propanol, and morpholine. The addition amount of these basic compounds is not particularly limited as long as it is 50 mol % or more with respect to the neutralization equivalent of the resin dispersing agent.

The molecular weight of the resin dispersing agent is preferably in the range of 1,000 to 100,000 as the weight average molecular weight. By the molecular weight being in the above range, the pigment is stably dispersed in water, and furthermore dynamic viscosity control and the like are easy during application to the auxiliary ink composition.

In addition, the acid value is preferably in the range of 30 to 300, and more preferably in the range of 50 to 150. By the acid value being in the above range, it is possible to stably secure the dispersibility of the pigment particles in water.

In addition, examples of the surfactant used in the surfactant dispersed pigment include alkane sulfonic acid salts, α-olefin sulfonic acid salts, alkyl benzene sulfonate, alkyl naphthalene sulfonate, acyl methyltaurine acid salts, dialkyl sulfo succinate, alkyl sulfate ester salts, olefin sulfate, polyoxyethylene alkyl ether sulfate ester salts, alkyl phosphate ester salts, polyoxyethylene alkyl ether phosphate ester salts, anionic surfactants such as monoglycidyl celite phosphate ester salts, alkyl pyridinium salts, alkyl amino acid salts, amphoteric surfactants such as alkyl dimethyl betaine, polyoxyethylene alkyl ethers, polyoxyethylene alkyl phenyl ether, polyoxyethylene alkyl esters, polyoxyethylene alkyl amide, glycerin alkyl esters, and non-ionic surfactants such as sorbitan alkyl esters.

The addition amount with respect to the resin dispersed agent or the pigment of the surfactant is preferably 1 part by mass to 100 parts by mass with respect to 100 parts by mass of pigment, and more preferably 5 parts by mass to 50 parts by mass. By being in this range, the dispersion stability of the pigment in water is further improved.

As the method of dispersing the above-mentioned resin dispersed pigment, surfactant dispersed pigment, and surface treated pigment in water, it is possible to add pigment, water, and the resin dispersing agent for the resin dispersed pigment; pigment, water, and a surfactant for the surfactant dispersed pigment; the surface treated pigment and water for the surface treated pigment; as well as a water-soluble organic solvent, neutralizing agent, and the like as respectively necessary, and perform dispersion in a dispersing machine used in the related art such as a ball mill, a sand mill, an attritor, a roll mill, an agitator mill, a Henschel mixer, a colloid mill, an ultrasonic homogenizer, a jet mill, an ong mill, or the like. In such a case, as the particle diameter of the pigment, dispersion until the average particle diameter reaches 20 nm to 500 nm, more preferably 50 nm to 180 nm is preferable in terms of securing the dispersion stability of the pigment in the water.

1.2.4. Other Components

The auxiliary ink composition according to the embodiment is able to further contain water, resins, glycol ethers, pH adjusting agents, fungicides or preservatives, rust inhibitors, chelating agents, or the like. If the ink composition according to the present embodiment contains these compounds, its characteristics may be further improved in some cases. Since specific examples of these components are the same as those exemplified in the ink composition for recording, description thereof will be omitted.

1.2.5. Preparation Method of Auxiliary Ink Composition

The auxiliary ink composition according to the present embodiment is obtained by mixing the above-mentioned components in an arbitrary order, performing filtration or the like according to necessity, and removing impurities. As the method of mixing each component, a method of sequentially adding material to a container provided with a stirring apparatus such as a mechanical stirrer or a magnetic stirrer and then stirring and mixing may be favorably used. As the method of filtration, it is possible to perform centrifugal filtration, filtration using a filter, or the like according to necessity.

1.2.6. Properties of Auxiliary Ink Composition

In the auxiliary ink composition according to the present embodiment, from the point of view of easily washing away the ink composition for recording in the ink flow path, the surface tension at 20° C. is preferably 15 mN/m to 35 mN/m, and more preferably 15 mN/m to 30 mN/m. Here, it is possible to perform the measurement of the surface tension using the same methods as the method indicated in the above-described ink composition for recording.

In addition, from a similar point of view, the dynamic viscosity at 20° C. of the auxiliary ink composition according to the present embodiment is preferably 3 $mm^2/s$ to 10 $mm^2/s$, and more preferably 3 $mm^2/s$ to 6 $mm^2/s$. Here, it is possible to perform the measurement of the dynamic viscosity using the same methods as the method indicated in the above-described ink composition for recording.

The pH of the auxiliary ink composition is preferably neutral or alkaline, and more preferably within a range of 7.0 to 10.0. By the pH being in the above-described range, the storage stability of the auxiliary ink composition becomes favorable. In addition, in a case where metal components are used in the ink flow path of the ink jet recording apparatus, it is possible to suppress the generation of corrosion or the like.

In addition, from the point of view of suppressing the aggregation of the ink composition for recording and the auxiliary ink composition and increasing the compatibility of both ink compositions, the relationship between the pH ($pH_1$) of the ink composition for recording and the pH ($pH_2$) of the auxiliary ink composition preferably satisfies the following formula (4). In this manner, the auxiliary ink composition easily washes away the ink composition for recording and there are cases where the storage stability of the ink composition for recording is improved in conjunction therewith.

$$pH_1 \leq pH_2 + 1 \tag{4}$$

The auxiliary ink composition according to the present embodiment preferably has a freezing temperature −15° C. or less at a pressure of one atmosphere, and more preferably −20° C. or less. In this manner, it is possible to use the auxiliary ink composition according to the present embodiment as a transporting liquid which is filled inside the ink flow path and used in order to prevent damage to the ink flow path of the ink jet recording apparatus during transport.

2. INK JET RECORDING APPARATUS

The ink for recording according to the present embodiment circulates in the ink flow path, is ejected as liquid droplets from the nozzles of the ink jet recording head (below, simply referred to as "head"), and is attached to the recording medium. In such a manner, it is possible to obtain a recording in which an image formed by ink for recording is recorded on a recording medium.

Below, description will be given of an ink jet recording apparatus provided with a head which is capable of ejecting the ink composition for recording and the auxiliary ink composition according to the present embodiment with reference to FIGURE. In each FIGURE used in the following description, the scale of each member is appropriately changed to make each member a visually recognizable size. In the present embodiment, an ink jet printer (below, simply referred to as "printer") is exemplified as the ink jet recording apparatus. Here, the invention is not limited to this apparatus configuration.

FIGURE is a perspective view showing a configuration of a printer 1 in the embodiment. The printer 1 shown in FIGURE is a serial printer. A serial printer refers to one in which a head is mounted on a carriage moving in a predetermined direction and in which liquid droplets are ejected onto a recording medium by the head moving in accordance with the movement of the carriage.

As shown in FIGURE, the printer 1 has a carriage 3 on which a head 2 is mounted, a carriage moving mechanism 4 moving the carriage 3 in the medium width direction of the recording medium P, and a medium transporting mechanism 5 transporting the recording medium P in the medium transporting direction. In addition, the printer 1 has a control unit 6 controlling the operation of the printer 1 as a whole. Here, the above-described medium width direction is the main scanning direction (head scanning direction). The above-described medium transporting direction is the sub scanning direction (direction perpendicular to the main scanning direction).

As shown in FIGURE, the head 2 is connected to an ink storing unit 10 individually storing the ink composition for recording and the auxiliary ink composition through an ink supply tube 20. The ink composition for recording and the auxiliary ink composition are configured to be able to supply each ink to the head 2 using a known switching device.

As the printer 1 according to the present embodiment, a so-called off carriage type printer in which the ink storing unit 10 is mounted in the housing or the like of the printer 1 and ink is supplied to the head 2 through the ink supply tube 20 has been exemplified; however, the invention is not limited thereto. For example, a so-called on carriage type printer in which an ink cartridge is mounted on a carriage may be used. In addition, a line head type printer which does not have a carriage may be used.

In addition, at the outside of the region where the recording medium P is transported within the movement range of the head 2, a home position is set as the scanning starting point of the head 2. A maintenance unit 7 including a cap member 17 is provided at the home position.

The maintenance unit 7 is configured to execute a moisturizing operation, a flushing operation, a head cleaning operation, and the like. Specifically, the moisturizing operation caps the head 2 with the cap member 17 except in the recording operation and suppresses the drying of the nozzle holes (not shown) of the head 2. In addition, the flushing operation prevents the clogging or the like of the nozzle holes by pre-discharging the ink composition for recording from the nozzles of the head 2 to the cap member 17. The head cleaning operation replaces the auxiliary ink composition in the ink flow path while driving a suction pump (not shown) and discharging the ink composition for recording from each nozzle hole after capping the head 2 with the cap member 17.

The ink flow path in the present specification refers to a flow path through which a liquid which flows out from an ink storing unit passes before being ejected from the nozzles of the head 2. For example, in the above-described printer 1, the ink supply tube 20 and the ink distribution channel of the inner portion of the head 2 are equivalent to the ink flow path.

3. CLEANING METHOD

The cleaning method according to the present embodiment is a cleaning method which cleans the ink flow path of the above-described ink jet recording apparatus, in which the above-mentioned auxiliary ink composition is circulated in the ink flow path.

Specifically, the cleaning of the ink flow path is performed by introducing the auxiliary ink composition into the ink flow path supplying the above-described ink composition for recording and replacing the ink composition for recording of the ink flow path with the auxiliary ink composition. By so doing, the sediment and the like inside the ink flow path is discharged from the nozzles along with the ink composition for recording, and it is possible to clean the ink flow path. It is possible to perform the replacement of the ink inside the ink flow path by the above-mentioned head cleaning operation.

After cleaning the ink flow path, in a case where the recording of the image using the ink jet recording apparatus is not performed for a long time, it is possible to keep the ink flow path filled with the auxiliary ink composition without changing. In this manner, it is possible to prevent the generation of sediment caused by the ink composition for recording.

On the other hand, in a case where the recording of the image is performed using the ink jet recording apparatus, the ink flow path may be refilled with the ink composition for recording by introducing the ink composition for recording into the ink flow path filled with the auxiliary ink composition and discharging the auxiliary ink composition from the nozzles.

The cleaning method according to the present embodiment uses the above-mentioned auxiliary ink composition. Therefore, since it is possible to suppress the generation of defects such as nozzle clogging and ink flow path clogging caused by the above-mentioned ink composition for recording, the cleaning property of the ink flow path in which the ink composition for recording is circulated is excellent.

In addition, in the cleaning method according to the present embodiment, when the ink composition for recording is present in the ink flow path, it is preferable to circulate the auxiliary ink composition at a flow rate of 0.1 ml/(second·mm$^2$) or more in the ink flow path. In this manner, it becomes even easier for the auxiliary ink composition to wash away the ink composition for recording present in the ink flow path, whereby the cleaning property of the ink flow path is remarkably improved.

4. EXAMPLES

Hereinafter, specific description will be given of the invention using examples and comparative examples; however, the invention is not limited to these examples.

4.1. Preparation of Ink Composition for Recording 4.1.1. Preparation of Metal Oxide Dispersion In the ink composition for recording according to the invention, white titanium oxide which is a metal oxide is used as the coloring material. When a metal oxide is added to the ink composition for recording, a resin dispersed metal oxide in which the metal oxide is dispersed in advance in a resin dispersion is used, and this is included in the ink composition for recording in the form of a metal oxide dispersion which is mainly water.

Specifically, the metal oxide dispersion is prepared in the following manner. Firstly, 4 parts by mass of acrylic acid-acrylic acid ester copolymer (weight average molecular weight: 25,000, acid value: 180) as the resin dispersing agent was added to and dissolved in 75 parts by mass of ion-exchanged water in which 1 part by mass of 30% ammonia aqueous solution (neutralizing agent) was dissolved. Then, 20 parts by mass of titanium oxide (C.I. pigment white 6) as a metal oxide were added and a dispersion process was performed for 10 hours in a ball mill using zirconia beads. Thereafter, centrifugal filtration was performed using a centrifuge, impurities such as coarse particles and dust were removed, and the metal oxide concentration was adjusted to become 20 mass %. The particle diameter of the metal oxide at that time was 350 nm as the average particle diameter.

4.1.2. Preparation of Ink Composition for Recording

Using the metal oxide dispersion prepared in the above-described "4.1.1. Preparation of metal oxide dispersion", a white ink composition for recording 1 was obtained with the material composition shown in Table 1. After placing the material shown in Table 1 in a container and stirring and mixing for two hours with a magnetic stirrer, the ink composition for recording 1 was prepared by removing the impurities such as dust and coarse particles by performing filtration with a membrane filter having a pore diameter of 5%. Here, the numerical values in Table 1 are all in mass % and ion-exchanged water was added so that the total mass of the ink composition for recording became 100 mass %.

4.2. Preparation of Auxiliary Ink Composition 4.2.1. Preparation of Coloring Material Dispersion In a part of the auxiliary ink composition to be used in the present Example, carbon black, which is a black pigment was used as a coloring material. When the auxiliary ink composition is added to the coloring material using the pigment, a pigment dispersion in which the coloring material is dispersed in advance in a resin dispersing agent is used, and this is included in the auxiliary ink composition in a state where the pigment dispersion is mainly water.

Specifically, the pigment dispersion is prepared in the following manner. Firstly, 7.5 parts by mass of acrylic acid-acrylic acid ester copolymer (weight average molecular weight: 25,000, acid value: 180) as the resin dispersing agent was added to and dissolved in 76 parts by mass of ion-exchanged water in which 1.5 parts by mass of 30% ammonia aqueous solution (neutralizing agent) was dissolved. Then, 15 parts by mass of carbon black pigment (C.I. pigment white 7) as the coloring material were added and a dispersion process was performed for 10 hours in a ball mill using zirconia beads. Thereafter, centrifugal filtration was performed using a centrifuge, impurities such as coarse particles and dust were removed, and the pigment concentration was adjusted to become 15 mass %.

4.2.2. Preparation of Auxiliary Ink Composition

With the material compositions shown in Table 1, the auxiliary ink compositions 1 to 7 having different material compositions were obtained. After placing the material shown in Table 1 in a container and stirring and mixing for two hours with a magnetic stirrer, each auxiliary ink composition was prepared by removing the impurities such as dust and coarse particles by performing filtration with a membrane filter having a pore diameter of 5 μm. Here, the numerical values in Table 1 are all in mass % and ion-exchanged water was added so that the total mass of the auxiliary ink composition became 100 mass %.

TABLE 1

| Material | Ink composition for recording | Auxiliary ink composition | | | | | | |
|---|---|---|---|---|---|---|---|---|
| | | 1 | 2 | 3 | 4 | 5 | 6 | 7 |
| Metal oxide dispersion (metal oxide content: 20 mass %) | 50 | — | — | — | — | — | — | — |
| Pigment dispersion (pigment content: 15 mass %) | — | — | — | — | — | 0.67 | — | — |
| JONCRYL 352J (styrene-acrylic acid copolymer emulsion) <45% dispersion> (Resin) | 10 | — | — | — | — | — | — | — |
| AQUACER 515 (polyethylene wax emulsion) <35% dispersion> (wax) | 2.86 | — | — | — | — | — | — | — |

TABLE 1-continued

|  | Ink composition for recording | Auxiliary ink composition | | | | | | |
|---|---|---|---|---|---|---|---|---|
| Material |  | 1 | 2 | 3 | 4 | 5 | 6 | 7 |
| 1,2-hexanediol (water-soluble organic solvent) Boiling point: 224° C. | 3 | 3 | 3 | 5 | 5 | 3 | 3 | 3 |
| Propylene glycol (water-soluble organic solvent) Boiling point: 189° C. | 15 | 25 | — | 20 | 20 | 25 | 15 | 25 |
| 1,2-butanediol (water-soluble organic solvent) Boiling point: 192° C. | — | 5 | 15 | — | 5 | 5 | 5 | 5 |
| 1,3-butylene glycol (water-soluble organic solvent) Boiling point: 208° C. | — | — | 15 | 15 | 5 | — | — | — |
| 2-pyrrolidone (water-soluble organic solvent) Boiling point: 245° C. | — | 3 | 3 | — | 3 | 3 | 3 | 3 |
| BYK-348 (silicone-based surfactant) | 0.5 | 0.2 | 0.2 | 0.2 | 0.2 | 0.2 | 0.2 | — |
| Surfynol DF110D (acetylene glycol-based surfactant) HLB value: 3 | 0.3 | 0.2 | 0.2 | 0.2 | 0.2 | 0.2 | 0.2 | — |
| Triethanol amine (pH adjusting agent) | 0.1 | 0.1 | 0.1 | 0.1 | 0.1 | 0.1 | 0.1 | 0.1 |
| Ethylenediamine tetraacetic acid (chelating agent) | 0.05 | 0.05 | 0.05 | 0.05 | 0.05 | 0.05 | 0.05 | 0.05 |
| Benzotriazole (rust inhibitor) | 0.02 | 0.02 | 0.02 | 0.02 | 0.02 | 0.02 | 0.02 | 0.02 |
| Ion-exchanged water | Remainder | Remainder | Remainder | Remainder | Remainder | Remainder | Remainder | Remainder |
| Property value: dynamic viscosity (20° C., mm$^2$/s) | 3.7 | 3.9 | 4.0 | 4.4 | 4.0 | 4.0 | 3.5 | 3.7 |
| pH (20° C.) | 8.6 | 9.0 | 8.8 | 8.9 | 9.0 | 9.1 | 9.0 | 9.0 |
| Surface Tension (20° C., mM/m) | 26.0 | 23.0 | 24.0 | 24.5 | 25.0 | 23.5 | 24.0 | 37.0 |
| Freezing temperature (° C.) | — | −23.0 | −22.0 | −24.0 | −22.5 | −22.5 | −18.0 | −21.0 |

Here, in Table 1, the components listed by product name are as follows.

JONCRYL 352J (trade name, manufactured by BASF Japan Ltd., styrene-acrylic acid-based copolymer emulsion)

AQUACER 515 (trade name, manufactured by BYK-Chemie Japan Co., Ltd., polyethylene wax emulsion)

BYK-348 (trade name, BYK-Chemie Japan Co., Ltd., silicone-based surfactant)

Surfynol DF-110D (trade name, manufactured by Air Products and Chemicals Inc., acetylene glycol-based surfactant, HLB value: 3)

4.3. Evaluation Test
4.3.1. Cleaning Property Evaluation

When performing the present evaluation, using an ink jet printer PX-G930 (trade name, manufactured by Seiko Epson Corporation, nozzle resolution: 180 dpi) which is an ink jet recording type printer, alterations were performed to install a rotary pump capable of changing the number of rotations in the head suction cap for cleaning the printer, and evaluation was performed thereon. In addition, the present evaluation was performed under conditions of 20° C. to 25° C./RH 40% to 60%.

First, after the white ink composition for recording 1 was filled in the printer altered as described above and ejection confirmation was performed, and it was confirmed that the ink composition for recording 1 was sufficiently filled in the inner portion of the head and in all nozzles, the apparatus was paused and left to stand as it was for three days. After being left to stand, a silicon tube provided with a container was installed in the ink supply port portion of the head, and the auxiliary ink compositions 1 to 7 were filled in the container. Then, by adjusting the number of rotations of the rotary pump to reach a desired flow rate and circulating the auxiliary ink compositions 1 to 7 of three times the amount of the filled ink composition for recording 1, the ink composition for recording 1 in the inner portion of the head was cleaned. Thereafter, by recording as is on a PET film (trade name "PET 50A PL Shin", manufactured by Lintec Corporation) and visually observing the conditions of the white color of the recording, the cleaning property of the ink composition for recording 1 by the auxiliary ink composition was evaluated. As a printed pattern, a fill pattern which could be printed with 100% duty at a resolution of 720 dpi horizontally and 720 dpi vertically was produced and used.

The evaluation criteria are shown below. Here, the evaluation was performed for each flow rate of [0.05 ml/(second·mm$^2$), 0.1 ml/(second·mm$^2$), 0.5 ml/(second·mm$^2$), and 1 ml/(second·mm$^2$)].

A: The ink composition for recording is not mixed at all.
B: The ink composition for recording is mixed slightly; however, it is almost invisible.
C: The ink composition for recording is fairly well mixed, and is easily visible.
D: The ink composition for recording is well mixed, and has hardly been cleaned.

4.3.2. Refilling Property Evaluation

The auxiliary ink compositions 1 to 7 were filled in the inner portion of the head of the ink jet printer PX-G930. Then, by performing the head cleaning operation, the auxiliary ink compositions in the inner portion of the head were replaced with the ink composition for recording 1. Thereafter, by recording as is on a PET film (trade name "PET 50A PL Shin", manufactured by Lintec Corporation) and visually observing the ejection condition of the recording (confirming the conditions of missed out nozzles, bending, and the like) and the color mixing of the recording, the refilling property of the ink composition for recording 1 for each of the auxiliary ink compositions 1 to 7 was evaluated. As a recording pattern used for confirmation, a head nozzle checking pattern included in a printer driver was used as is in the confirmation of the refilling property, and a fill pattern which could be printed with 100% duty at a resolution of 720 dpi horizontally and 720 dpi vertically was produced and used for the color mixing conditions.

The evaluation criteria are shown below.

Ejection Property

A: With one head cleaning operation, there were no defects such as missing nozzles, bending, or the like in any of the nozzles, and the ink composition for recording was ejected normally.

B: With two to five head cleaning operations, there were no defects such as missing nozzles, bending, or the like in any of the nozzles, and the ink composition for recording was ejected normally.

C: With six to ten head cleaning operations, there were no defects such as missing nozzles, bending, or the like in any of the nozzles, and the ink composition for recording was ejected normally.

D: Even with ten or more head cleaning operations, there were defects such as missing nozzles, bending, or the like, and there were nozzles which could not eject the ink composition for recording normally.

Color Mixing Conditions

A: The auxiliary ink composition is not mixed at all.

B: The auxiliary ink composition is mixed slightly; however, it is almost invisible.

C: The auxiliary ink composition is fairly well mixed, and is easily visible.

D: The auxiliary ink composition is well mixed, or there are many missing nozzles and a high degree of bending and filling is hardly possible.

4.3.3. Evaluation Results

The results of the above evaluation tests are also shown in Table 2.

formula (1) and formula (2) at the same time, it is shown that the cleaning property of the ink flow path is excellent and the ejection stability is excellent.

On the other hand, in the ink set according to comparative example 1, the relationship of the dynamic viscosity between the auxiliary ink composition and the ink composition for recording does not satisfy the above-described formula (1). Therefore, the cleaning property of the ink composition for recording by the auxiliary ink composition and the refilling property of the ink composition for recording were decreased.

In addition, in the ink set according to comparative example 2, the relationship of the surface tension between the auxiliary ink composition and the ink composition for recording does not satisfy the above-described formula (2). Therefore, the cleaning property of the ink composition for recording by the auxiliary ink composition and the refilling property of the ink composition for recording were decreased.

Here, in the ink set according to Example 5, the auxiliary ink composition 5 to which a coloring material was added was used. Using the auxiliary ink composition 5, a nozzle checking pattern included in the printer driver was used as is and recorded on PPC paper and, when nozzle checking was performed, it was easy to visually confirm the ejection conditions of the nozzles (that is, the filling conditions of the auxiliary ink composition 5 into the inner portion of the head). Accordingly, by adding the coloring material of the auxiliary ink composition of the invention in a small amount (0.5 mass % or less by coloring material solid content conversion), it is shown that it is possible to favorably use the above even as a testing liquid for the ink jet printer head.

The invention is not limited to the embodiments described above and various modifications thereof are possible. For example, the invention includes configurations which are the substantially the same as the configurations described in the embodiments (for example, configurations having the same function, method and results, or configurations having the same purpose and effect). In addition, the invention includes

TABLE 2

|  |  |  | Examples |  |  |  |  | Comparative Examples |  |
|---|---|---|---|---|---|---|---|---|---|
|  |  |  | 1 | 2 | 3 | 4 | 5 | 1 | 2 |
| Used ink set | | Ink composition for recording | 1 | 1 | 1 | 1 | 1 | 1 | 1 |
| | | Auxiliary ink composition | 1 | 2 | 3 | 4 | 5 | 6 | 7 |
| Evaluation results | Cleaning property | Flow rate: 0.1 ml/ (second · mm²) | B | B | A | B | B | C | D |
| | | Flow rate: 0.5 ml/ (second · mm²) | B | A | A | A | B | B | C |
| | | Flow rate: 1 ml/ (second · mm²) | A | A | A | A | A | A | B |
| | | Flow rate: 0.05 ml/ (second · mm²) | C | C | B | C | C | D | D |
| | Refilling property | Ejection property | A | A | A | A | A | C | D |
| | | Color mixing conditions | A | A | B | B | A | C | D |

As shown in Table 2, when the ink sets according to the Examples are used, it is shown that the cleaning property of the ink composition for recording by the auxiliary ink composition is excellent and the refilling property of the ink composition for recording is also excellent. In this manner, by the relationship between the dynamic viscosity and the surface tension of the auxiliary ink composition and the ink composition for recording satisfying the above-described configurations in which non-essential parts of the configurations described in the embodiments are replaced. In addition, the invention includes configurations exhibiting the same operation and effect as the configurations described in the embodiments or configurations capable of achieving the same purpose. In addition, the invention includes configurations in which known techniques were added to the configurations described in the embodiments.

What is claimed is:

1. An ink jetting ink set comprising:
an ink composition for recording supplied to and used in an ink flow path and containing at least one of a glitter pigment and a metal oxide as a coloring material; and
an auxiliary ink composition used in cleaning of the ink flow path,
wherein the ink composition for recording is different from the auxiliary ink composition,
wherein the auxiliary ink composition contains an alkyl polyol having a content of 20 mass % to 50 mass % with respect to the total mass of the auxiliary ink composition, and
wherein, in cases where a dynamic viscosity at 20° C. in the ink composition for recording is $\eta 1$ (mm$^2$/s) and a surface tension at 20° C. is $\gamma 1$ (mN/m), and the dynamic viscosity at 20° C. in the auxiliary ink composition is $\eta_2$ (mm$^2$/s) and the surface tension at 20° C. is $\gamma_2$ (mN/m), the following formula (1) and the following formula (2) are satisfied at the same time:

$$\eta_1 \leq \eta_2 \quad (1)$$

$$\gamma_1 \geq \gamma_2 \quad (2).$$

2. The ink jetting ink set according to claim 1, wherein $\eta_2$ is 3 (mm$^2$/s) to 10 (mm$^2$/s), and $\gamma_2$ is 15 (mN/m) to 35 (mN/m).

3. The ink jetting ink set according to claim 1, wherein the auxiliary ink composition contains a surfactant having an anti-foaming property.

4. The ink jetting ink set according to claim 1, wherein the ink composition for recording contains a kind of alkyl polyol with a normal boiling point of 180° C. to 250° C. without substantially containing a kind of alkyl polyol with a normal boiling point of 280° C. or more, and the alkyl polyol in the auxiliary ink composition has a normal boiling point of 180° C. to 250° C.

5. The ink jetting ink set according to claim 1, wherein the auxiliary ink composition contains a coloring material having a content of 0.5 mass % or less relative to the mass of the auxiliary ink composition.

6. The ink jetting ink set according to claim 1, wherein a freezing temperature of the auxiliary ink composition at a pressure of one atmosphere is −15° C. or less.

* * * * *